Patented Dec. 28, 1926.

1,612,154

UNITED STATES PATENT OFFICE.

JAMES B. SAMPSON, OF McKEESPORT, PENNSYLVANIA.

TEMPORARY DENTAL CEMENT OR FILLING.

No Drawing. Application filed January 9, 1926. Serial No. 80,350.

My invention relates to a temporary dental cement or filling.

An important object of the invention is to provide a cement or filling of the above mentioned character, which may be placed upon the market in a collapsible tube and will retain its plastic condition, until discharged from the tube, at the time of use.

In accordance with my invention, I provide a liquid mass embodying the following ingredients, preferably combined in the following proportions:

Alcohol ten parts by liquid measure.
Glycerine forty parts by liquid measure.
Eugenol ten parts by liquid measure.

These ingredients are thoroughly stirred. I then take any suitable amount of this liquid mass and mix with it a sufficient quantity of powdered zinc-oxide to form a white mass having a pasty consistency. I have found that satisfactory results are obtainable by combining 62½% parts by weight of the powdered zinc-oxide with 37½% parts by weight of the liquid mass, although the proportion may be varied as the zinc-oxide is to be added in a suitable amount to produce the white mass of a pasty consistency.

The eugenol mixed with the zinc-oxide forms what might be called a zinc-eugenate (or eugenolate) which become very hard and is only slightly soluble in water. The presence of the glycerine with this zinc-eugenate, will retain the mass plastic, when it is kept within a sealed container. The alcohol is added so that when the mix is discharged from the container, such alcohol will readily evaporate, and the mass will then set and harden.

I have found that the preparation, after being produced, as above indicated, may be put into a collapsible tube, and of course, sealed from the atmosphere. In this form, the preparation may be placed upon the market and will retain its plastic consistency until it is discharged from the tube, at the time it is used. When introduced into the cavity of the tooth the alcohol quickly evaporates and the mass will set and harden. The mass is only slightly soluble in water and serves as an excellent temporary filling or cement.

It is to be understood that the form of my invention herewith shown and described, is to be taken as a preferred example of the same and that various changes in the proportions of the several ingredients may be resorted to and that chemical equivalents may be employed, without departing from the spirit of my invention or the scope of the subjoined claims.

Having thus described my invention, I claim:

1. A temporary dental filling comprising the constituents of eugenol, zinc-oxide, glycerine and alcohol, present in such proportions that a plastic mass is produced which will not harden in a collapsible tube.

2. A temporary dental filling comprising substantially sixty-two and one-half parts by weight of zinc-oxide and thirty-seven and one-half parts by weight of a liquid mass, said liquid mass containing the constituents of substantially ten parts by liquid measure of alcohol, forty parts by liquid measure of glycerine, and ten parts by liquid measure of eugenol.

In testimony whereof I affix my signature.

JAMES B. SAMPSON.